United States Patent
Esser et al.

(10) Patent No.: US 8,494,809 B2
(45) Date of Patent: Jul. 23, 2013

(54) TOOL FOR CALCULATING THE PERFORMANCE OF PROGRESSIVE LENSES

(75) Inventors: Gregor Esser, Munich (DE); Heejin Kim, Seoul (KR); Helmut Altheimer, Baisweil-Lauchdorf (DE); Wolfgang Becken, Munich (DE); Dietmar Uttenweiler, Munich (DE)

(73) Assignee: Rodenstock GmbH, Munich (DE)

( * ) Notice: Subject to any disclaimer, the term of this patent is extended or adjusted under 35 U.S.C. 154(b) by 814 days.

(21) Appl. No.: 12/063,805

(22) PCT Filed: Jul. 20, 2006

(86) PCT No.: PCT/EP2006/007166
§ 371 (c)(1),
(2), (4) Date: Apr. 6, 2010

(87) PCT Pub. No.: WO2007/019938
PCT Pub. Date: Feb. 22, 2007

(65) Prior Publication Data
US 2010/0191504 A1    Jul. 29, 2010

(30) Foreign Application Priority Data
Aug. 17, 2005 (DE) .......... 10 2005 038 859

(51) Int. Cl.
*G06F 11/30* (2006.01)
*G01N 37/00* (2006.01)

(52) U.S. Cl.
USPC .......................... 702/182; 702/81

(58) Field of Classification Search
USPC .......................... 702/182, 81, 183
See application file for complete search history.

(56) References Cited

U.S. PATENT DOCUMENTS

| 4,676,610 A | | 6/1987 | Barkan et al. |
| 4,838,675 A | * | 6/1989 | Barkan et al. ............ 351/159.42 |
| 5,661,816 A | * | 8/1997 | Fantone et al. ............... 382/100 |

(Continued)

FOREIGN PATENT DOCUMENTS

| DE | 197 01 312 A1 | 7/1998 |
| DE | 103 13 275 A1 | 10/2004 |

(Continued)

OTHER PUBLICATIONS

International Search Report dated Oct. 23, 2006 with English translation of relevant portion and PCT/ISA/237 with English translation of Supplemental Sheets (Nineteen (19) pages).

(Continued)

*Primary Examiner* — Michael Nghiem
(74) *Attorney, Agent, or Firm* — Crowell & Moring LLP

(57) ABSTRACT

The invention relates to a method for computer-assisted evaluation of the performance of progressive lenses, specifically while taking into account individual parameters of a given eyeglass wearer, the individual parameters including at least personal prescription data, in particular, additional spherical, astigmatic, and/or prismatic power, and/or personal wearer data for the eyeglass wearer, in particular, forward inclination, horizontal frame inclination, corneal vertex distance, and/or interpupillary distance. The method includes the following steps: determining the individual parameters; calculating a total performance factor P in each case for at least two quality classes of progressive lenses as a function of the individual parameters, the total performance factor P being correlated with the quality of the monocular visual acuity and/or binocular visual impression; and outputting the calculated total performance factor P for the quality classes.

35 Claims, 7 Drawing Sheets

U.S. PATENT DOCUMENTS

| | | | |
|---|---|---|---|
| 5,719,658 A * | 2/1998 | Ahsbahs et al. | 351/159.42 |
| 5,880,810 A * | 3/1999 | Altheimer et al. | 351/159.42 |
| 6,072,570 A * | 6/2000 | Chipman et al. | 356/124 |
| 6,089,713 A | 7/2000 | Hof et al. | |
| 6,366,823 B1 * | 4/2002 | Shirayanagi | 700/97 |
| 6,871,955 B2 * | 3/2005 | Yamakaji et al. | 351/159.42 |
| 7,193,713 B2 | 3/2007 | Shiode | |
| 7,344,245 B2 * | 3/2008 | Fisher et al. | 351/159.42 |
| 7,347,546 B2 * | 3/2008 | Esser et al. | 351/159.75 |
| 2004/0027678 A1 * | 2/2004 | Welk et al. | 359/642 |
| 2007/0132945 A1 | 6/2007 | Haser et al. | |

FOREIGN PATENT DOCUMENTS

| | | |
|---|---|---|
| EP | 0 132 955 A2 | 2/1985 |
| EP | 0 295 849 A2 | 12/1988 |
| EP | 0 994 336 A2 | 4/2000 |
| JP | 60-48017 A | 3/1985 |
| JP | 64-63923 A | 3/1989 |
| JP | 2000-105301 A | 4/2000 |
| JP | 2003-214986 A | 7/2003 |
| JP | 2004-500537 A | 1/2004 |
| JP | 2004-146454 A | 5/2004 |
| JP | 2004-177334 A | 6/2004 |
| JP | 2005-83861 A | 3/2005 |
| WO | WO 01/81979 A2 | 11/2001 |
| WO | WO 2004/046792 A1 | 6/2004 |
| WO | WO 2004/059710 A1 | 7/2004 |
| WO | WO 2004/086125 A1 | 10/2004 |

OTHER PUBLICATIONS

German Office Action dated May 11, 2006 with English translation of relevant portion (Nine (9) pages).

International Preliminary Report dated Mar. 4, 2008 (13 pages).

Japanese Office Action with English Translation dated Feb. 14, 2012, (six (6) pages).

Partial Translation of European Office Action dated Nov. 25, 2011 (6 pages).

Japanese Office Action dated Dec. 18, 2012 w/English translation (six (6) pages).

Japanese-language Office Action dated Apr. 9, 2013 (Two (2) pages).

* cited by examiner

| | | | |
|---|---|---|---|
| Sphere | 3.00 | dpt | ◁▭▭▭▭▭▭▭■▭▭▭▭▷ |
| Cylinder | 0.00 | dpt | ◁■▭▭▭▭▭▭▭▭▭▭▭▷ |
| Axle | 0.0 | Grad | ◁■▭▭▭▭▭▭▭▭▭▭▭▷ |
| Addition | 2.00 | dpt | ◁▭▭▭▭■▭▭▭▭▭▭▭▷ |
| Prism | 0.00 | cm/m | ◁■▭▭▭▭▭▭▭▭▭▭▭▷ |
| Basis | 45.00 | GradTabo | ◁▭■▭▭▭▭▭▭▭▭▭▭▷ |

Fig. 9

| | | | |
|---|---|---|---|
| Interpupillary Distance | 64.0 | mm | ◁▭▭▭▭▭▭■▭▭▭▭▷ |
| Corneal Vertex Distance | 13.0 | mm | ◁▭▭▭▭■▭▭▭▭▭▭▷ |
| Forward Inclination | 11.0 | Grad | ◁▭▭▭▭▭▭■▭▭▭▭▷ |
| Horizontal Frame Inclination | 5.0 | Grad | ◁▭▭▭▭▭■▭▭▭▭▭▷ |

Fig. 10

| | | | |
|---|---|---|---|
| Quality Class ILT | 98.6 | ▓▓▓▓▓▓▓▓▓▓▓▓▓▓▓ | —2 |
| Quality Class MG | 89.0 | ▓▓▓▓▓▓▓▓▓▓▓▓▓░ | —4 |
| Quality Class GB | 74.4 | ▓▓▓▓▓▓▓▓▓▓░░░░ | —6 |
| Quality Class FL | 45.1 | ▓▓▓▓▓▓░░░░░░░░ | —8 |

Fig. 11

TOOL FOR CALCULATING THE PERFORMANCE OF PROGRESSIVE LENSES

The invention relates to a method for evaluating the performance of progressive lenses and a corresponding device, a computer program product, a storage medium, and a graphical user interface.

BACKGROUND OF THE INVENTION

Individual eyeglass lenses, in particular progressive individual eyeglass lenses, have much better imaging characteristics than conventional eyeglass lenses, and thus provide great customer value for the end user. Individual eyeglass lenses have been described in numerous patent publications, for example DE 197 01 312, DE 103 13 275, or WO 01/81979.

However, the extent of this advantage depends greatly on the individual parameters themselves. If these individual parameters deviate very much from the average values, the advantage and thus the customer value for the end user is much greater than when the individual parameters are very close to the average parameters.

SUMMARY OF THE INVENTION

The object of the present invention is to provide a rapid method for calculating the performance of progressive lenses for specific individual parameters, in particular without a full calculation of the surfaces of the progressive lenses.

According to the invention, a method is provided for computer-assisted evaluation or determination of the performance, i.e., the activity effect or the performance effect, of progressive lenses, specifically while taking into account individual parameters of a given eyeglass wearer, the individual parameters including at least personal prescription data, in particular, additional spherical, astigmatic, and/or prismatic power, and/or personal wearer data for the eyeglass wearer, in particular forward inclination, horizontal frame inclination, corneal vertex distance, and/or interpupillary distance, the method including the following steps:
Determining the individual parameters;
Calculating a total performance or total activity effect factor P in each case for at least two quality classes of progressive lenses as a function of the individual parameters, the total performance factor P being correlated with the quality of the monocular visual acuity and/or binocular visual impression;
Outputting the calculated total performance factor P for the quality classes.

The total performance factor P is preferably obtained by multiplying the individual activity effect or performance effect performance factors, each of which is a function of the particular individual parameters or corresponds to same.

The personal prescription data preferably include the spherical power Sph and the magnitude Ast of the astigmatic power. The total performance factor P is preferably obtained by multiplying at least one first performance or activity effect factor $P_1$ by a second performance or activity effect factor $P_2$, the first performance factor $P_1$ being a function $$P_1(Sph) = \sum_{i=0}^{N} a_i * Sph^i$$

of the spherical power Sph, and the second performance factor $P_2$ being a function $$P_2(Ast) = \sum_{i=0}^{N} b_i * Ast^i$$

of the magnitude (i.e., of the cylinder) Ast of the astigmatic power. Coefficients $a_i$ are preferably N-order polynomial functions of the magnitude Ast of the astigmatic power, and coefficients $b_i$ are preferably N-order polynomial functions of the spherical power Sph.

The personal prescription data preferably include the axis direction A of the astigmatic power. The total performance factor P may preferably be obtained by also multiplying by a third performance or activity effect factor $P_3(A) = A_1 * \sin^2 A + A_2 * \cos^2 A$, coefficients $A_1$ and $A_2$ being N-order polynomial functions of the spherical power Sph and the magnitude Ast of the astigmatic power.

It is further preferred that the personal prescription data include the magnitude (i.e., the prism) Prism of the prismatic power. The total performance factor may be obtained by also multiplying by a fourth performance or activity effect factor $$P_4 = \sum_{i=0}^{N} c_i * Prism^i,$$

coefficients $c_i$ preferably being N-order polynomial functions of the magnitude Ast of the astigmatic power and the spherical power Sph.

The personal prescription data may also preferably include the prism base direction B of the prismatic power. The total performance factor may preferably be obtained by also multiplying by a fifth performance or activity effect factor $P_5(B) = B_1 * \sin^2 B + B_2 * \cos^2 B$, coefficients $B_1$ and $B_2$ being N-order polynomial functions of the spherical power Sph and the magnitude Ast of the astigmatic power.

It is further preferred that the personal wearer data include the corneal vertex distance (HSA) for the eyeglass wearer. The total performance factor may preferably be obtained by also multiplying by a sixth performance or activity effect factor $$P_6(HSA) = \sum_{i=0}^{N} d_i * HSA^i,$$

coefficients $d_i$ preferably being N-order polynomial functions of the magnitude Ast of the astigmatic power and the spherical power Sph.

The personal wearer data also preferably include the forward inclination V of the progressive lens provided in a specified eyeglass frame. The total performance factor is preferably obtained by also multiplying by a seventh performance or activity effect factor $$P_7(V) = \sum_{i=0}^{N} e_i * V^i,$$

coefficients $e_i$ preferably being N-order polynomial functions of the magnitude Ast of the astigmatic power and the spherical power Sph.

According to a further preferred embodiment, the personal wearer data include the horizontal frame inclination of a specified eyeglass frame in which the progressive lens is provided. The total performance factor is preferably obtained by also multiplying by an eighth performance or activity effect factor $$P_8(FSW) = \sum_{i=0}^{N} f_i * FSW^i,$$

coefficients $f_i$ preferably being N-order polynomial functions of the magnitude Ast of the astigmatic power and the spherical power Sph.

The personal wearer data also preferably include the interpupillary distance PD for the eyeglass wearer. The total performance factor may be obtained by also multiplying by a ninth performance or activity effect factor $$P_9(PD) = \sum_{i=0}^{N} g_i * PD^i,$$

coefficients $g_i$ preferably being N-order polynomial functions of the magnitude Ast of the astigmatic power and the spherical power Sph.

According to a further preferred embodiment, the personal prescription data include the addition ADD of the progressive lens. The total performance factor is preferably obtained by also multiplying by a tenth performance or activity effect factor $$P_{10}(ADD) = \sum_{i=0}^{N} h_i * ADD^i,$$

coefficients $h_i$ preferably being N-order polynomial functions of the magnitude Ast of the astigmatic power and the spherical power Sph.

The performance factors $P_i = P_i$ (Sph, Ast, ... ), i=1, 2, ... are preferably determined for multiple combinations of individual parameters essentially by a numerical fitting of the data for the relative size of the visual field of the progressive lenses of the particular quality class, the visual field size for a specified combination of individual parameters being defined as the ratio of the size of the visual field of a progressive lens of the particular quality class for the specified combination of individual parameters to a specified target size of the visual field. For each quality class, the data for the relative visual field size for the multiple combinations of individual parameters are preferably determined in advance and stored, for example in the form of a matrix, table, or series of vectors.

It is further preferred that all progressive lenses of all quality classes have essentially the same basic design. The quality classes preferably differ with respect to the type of optimization of the progressive lenses in the quality class as a function of the individual parameters.

The method for evaluating the performance of progressive lenses preferably also includes the following steps:
Entering the individual parameters;
Displaying the calculated total performance factors for the quality classes.

The calculated total performance factors are preferably displayed as bars, the lengths of which are correlated with the calculated total performance factor.

The above method allows rapid evaluation and/or demonstration of the performance or the advantages/disadvantages of progressive lenses belonging to different quality classes, in particular without the need for the progressive lenses (i.e., the front or back surface thereof) to be individually calculated or determined in advance.

Furthermore, a computer program product is provided according to the invention which, when loaded and executed on a computer or suitable system, is designed to execute or carry out the method for evaluating or determining the performance, i.e., the activity effect or the performance effect, of a progressive lens according to the invention or a preferred embodiment thereof.

Furthermore, a storage medium having a computer program stored thereon is provided according to the invention, the computer program when loaded and executed on a computer or suitable system being designed to execute or carry out the method for evaluating or determining the performance, i.e., the activity effect or the performance effect, of a progressive lens having the features according to the invention or a preferred embodiment thereof.

Furthermore, a device for computer-assisted evaluation or determination of the performance, i.e., the activity effect or the performance effect, of progressive lenses is provided according to the invention, specifically while taking into account individual parameters of a given eyeglass wearer, the individual parameters including at least personal prescription data, in particular addition, spherical, astigmatic, and/or prismatic power, and/or personal wearer data for the eyeglass wearer, in particular forward inclination, horizontal frame inclination, corneal vertex distance, and/or interpupillary distance, including:
Determination means for determining the individual parameters;
Calculation means for calculating a total performance factor P in each case for at least two quality classes of progressive lenses as a function of the individual parameters, the total performance factor P being correlated with the quality of the monocular visual acuity and/or binocular visual impression;
Output means for outputting the calculated total performance factor P for the quality classes.

The total performance factor is preferably obtained by multiplying together individual performance factors which are functions of the particular individual parameters.

It is further preferred for the personal prescription data to include the spherical power Sph and the magnitude Ast of the astigmatic power. The total performance factor P is preferably obtained by multiplying at least one first performance factor $P_1$ by a second performance factor $P_2$, the first performance factor $P_1$ being a function $$P_1(Sph) = \sum_{i=0}^{N} a_i * Sph^i$$

of the spherical power Sph, and the second performance factor $P_2$ being a function $$P_2(Ast) = \sum_{i=0}^{N} b_i * Ast^i$$

of the magnitude Ast of the astigmatic power. Coefficients $a_i$ are preferably N-order polynomial functions of the magnitude Ast of the astigmatic power, and coefficients $b_i$ are preferably N-order polynomial functions of the spherical power Sph.

The personal prescription data preferably include the axis direction A of the astigmatic power. The total performance factor P may preferably be obtained by also multiplying by a third performance factor $P_3(A)=A_1*\sin^2 A+A_2*\cos^2 A$, coefficients $A_1$ and $A_2$ being N-order polynomial functions of the spherical power Sph and the magnitude Ast of the astigmatic power.

It is further preferred that the personal prescription data include the magnitude Prism of the prismatic power. The total performance factor may preferably be obtained by also multiplying by a fourth performance factor $$P_4 = \sum_{i=0}^{N} c_i * Prism^i,$$

coefficients $c_i$ preferably being N-order polynomial functions of the magnitude Ast of the astigmatic power and the spherical power Sph.

The personal prescription data also preferably include the prism base direction B of the prismatic power. The total performance factor may preferably be obtained by also multiplying by a fifth performance factor $P_5(B)=B_1*\sin^2 B + B_2*\cos^2 B$, coefficients $B_1$ and $B_2$ being N-order polynomial functions of the spherical power Sph and the magnitude Ast of the astigmatic power.

It is further preferred that the personal wearer data include the corneal vertex distance for the eyeglass wearer. The total performance factor may preferably be obtained by also multiplying by a sixth performance factor $$P_6(HSA) = \sum_{i=0}^{N} d_i * HSA^i,$$

coefficients $d_i$ preferably being N-order polynomial functions of the magnitude Ast of the astigmatic power and the spherical power Sph.

The personal wearer data also preferably include the forward inclination V of the progressive lens provided in a specified eyeglass frame. The total performance factor is preferably obtained by also multiplying by a seventh performance factor $$P_7(V) = \sum_{i=0}^{N} e_i * V^i,$$

coefficients $e_i$ preferably being N-order polynomial functions of the magnitude Ast of the astigmatic power and the spherical power Sph.

The personal wearer data also preferably include the horizontal frame inclination of a specified eyeglass frame in which the progressive lens is provided. The total performance factor is preferably obtained by also multiplying by an eighth performance factor $$P_8(FSW) = \sum_{i=0}^{N} f_i * FSW^i,$$

coefficients $f_i$ preferably being N-order polynomial functions of the magnitude Ast of the astigmatic power and the spherical power Sph.

The personal wearer data preferably include the interpupillary distance PD for the eyeglass wearer. The total performance factor may preferably be obtained by also multiplying by a ninth performance factor $$P_9(PD) = \sum_{i=0}^{N} g_i * PD^i,$$

coefficients $g_i$ preferably being N-order polynomial functions of the magnitude Ast of the astigmatic power and the spherical power Sph.

According to a further preferred embodiment, the personal wearer data include the addition ADD of the progressive lens. The total performance factor is preferably obtained by also multiplying by a tenth performance factor $$P_{10}(ADD) = \sum_{i=0}^{N} h_i * ADD^i,$$

coefficients $h_i$ preferably being N-order polynomial functions of the magnitude Ast of the astigmatic power and the spherical power Sph.

It is further preferred for the performance factors $P_i=P_i$ (Sph, Ast, ... ), i=1, 2, ... 10 to be calculated in advance for multiple individual parameters for each quality class and stored, preferably in a database.

The performance factors $P_i=P_i$ (Sph, Ast, ... ), i=1, 2, ... are preferably determined for multiple combinations of individual parameters by a numerical fitting or adjustment of the data to the relative size of the visual field of the progressive lenses of the particular quality class, the relative visual field size for a specified combination of individual parameters being defined as the ratio of the size of the visual field of a progressive lens of the particular quality class for the specified combination of individual parameters to a specified target size of the visual field.

All progressive lenses of all quality classes preferably have essentially the same basic design. The quality classes preferably differ with respect to the type of optimization of the progressive lenses in the quality class as a function of the individual parameters.

The device according to the invention preferably has input means for inputting the individual parameters, and/or display means for displaying the calculated total performance factors for the quality classes.

The display means preferably displays the calculated total performance factors as bars, the lengths of which are correlated with the calculated total performance factor.

Furthermore, a graphical user interface (GUI) is provided according to the invention for representing the performance, i.e., the activity effect or performance effect, of progressive lenses, specifically while taking into account individual parameters of a given eyeglass wearer, including:

at least one prescription data input section for inputting personal prescription data, in particular addition, spherical, astigmatic, and/or prismatic power of a progressive lens; and/or at least one wearer data input section for inputting personal wearer data for the eyeglass wearer, in particular forward inclination, horizontal frame inclination, corneal vertex distance, and/or interpupillary distance; and at least one performance display section for representing total performance factors P for each quality class of progressive lenses as a function of the personal prescription data and/or personal wearer data, the total performance factor P being correlated with the quality of the monocular visual acuity and/or binocular visual impression.

The total performance factors are preferably displayed as bars, the lengths of which are correlated with the calculated total performance factor.

BRIEF DESCRIPTION OF THE DRAWINGS

The invention is described below by way of example, with reference to the accompanying figures which show the following:

FIG. 9 shows the input field for the personal prescription values in one embodiment of the user interface tool according to the invention;

FIG. 10 shows the input field for the individual parameters in one embodiment of the user interface tool according to the invention;

FIG. 11 shows the input field for the calculated performance values in one embodiment of the user interface tool according to the invention;

DETAILED DESCRIPTION OF THE DRAWINGS

Figure 1:
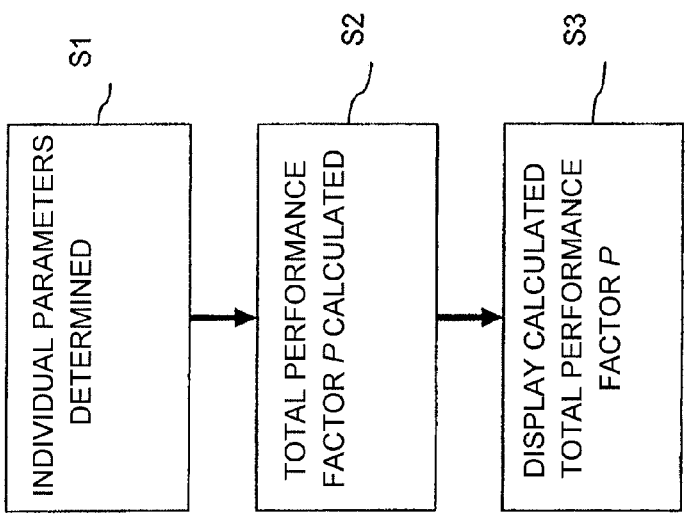
FIG. 1 shows a flow diagram of one preferred exemplary embodiment of the method according to the invention.

FIG. 1 illustrates a flow diagram of one preferred example of the method according to the invention for computer-assisted evaluation or determination of the performance, i.e., the activity effect or the performance effect, of at least one progressive lens.

In a first step S1 the individual parameters $\{Sph_a, Ast_a, A_a, \ldots\}$ of the eyeglass wearer are determined, in particular by inputting by an operator using a (preferably graphical) input interface (GUI). The individual parameters include in particular personal prescription data and/or personal wearer data for the eyeglass wearer. The personal prescription data include in particular the spherical power or prescription, astigmatic power or prescription (cylinder and axis), prismatic power or prescription (prism and/or prism base direction), and/or addition. The personal wearer data include in particular data characterizing the eyes of the eyeglass wearer or the properties thereof (for example, interpupillary distance, corneal vertex distance) and/or data characterizing the configuration of the eyeglass lens in front of the eyes of the eyeglass wearer (for example, forward inclination of the eyeglass lens, horizontal frame inclination, etc.)

In a second step S2 a total performance factor P is calculated in each case for at least two quality classes of progressive lenses as a function of the determined individual parameters $\{Sph_a, Ast_a, A_a, \ldots\}$. The total performance factor or value, i.e., the total activity effect or total performance effect P, is correlated with the quality of the monocular visual acuity and/or binocular visual impression. In other words, the total performance factor may be used to draw conclusions concerning the quality or performance of the individual quality classes so that in particular their suitability may be checked or represented.

The dependency of the total performance factor P on the individual parameters is preferably described by a total performance function. The total performance function (at least in part) is preferably determined in advance and stored (at least in part). The total performance function for the individual quality classes may be stored in the same computer that carries out the method for evaluating the performance of progressive lenses. The total performance functions may (alternatively or additionally) likewise be stored in an external database, which may be accessed via a mono-, bi-, or multi-directional network (for example, via the Internet). The total performance factors may then preferably be determined online (i.e., during performance of the method itself). The determination of the total performance function is described in greater detail below with reference to FIG. 2.

A third step S3 involves displaying the calculated total performance factor P for each of the quality classes, preferably for each of the quality classes present. The calculated total performance factors for each of the displayed quality classes are preferably represented as bars, the lengths of which are correlated with the magnitude of the particular total performance factor, using a graphical user interface or output on a display device (for example, a screen, printout, or the like).

Figure 2:
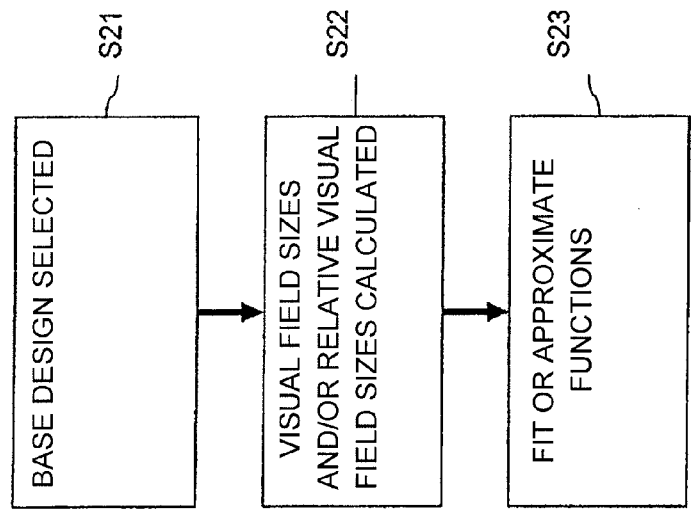
FIG. 2 shows a flow diagram of the calculation or determination of the total performance value.

FIG. 2 illustrates a flow diagram showing the calculation or determination of the total performance function in greater detail.

In a first step S21 a base design is selected, which preferably is substantially maintained for all quality classes of progressive lenses and/or for each combination of individual parameters. In this manner it may preferably be ensured that the differences in the determined total performance factors for the individual quality classes are based solely on the technology or optimization of the progressive lenses in the quality class, and not on the selected base design which, for example, may be selected to be harder with large visual field regions, or softer with smaller visual field regions.

The base design may be a hard, soft, and/or weighted design. The base design may preferably be defined in the form of error distribution(s) which in the optimization of a progressive lens associated with the quality class are used as target or setpoint specification(s) for different individual parameters. The base design preferably includes a target or setpoint specification for the visual field, i.e., a target or setpoint visual field, for the progressive lens. The base design may also include a distribution of the refractive and/or astigmatic errors. The base design also preferably includes a distribution of the magnification, anamorphotic distortion, vertical and/or horizontal prism, gradient of the refractive value, and/or astigmatism.

For specified average parameters, all progressive lenses of all quality classes preferably have essentially the same optical properties, in particular an essentially identical visual field. For the specified average parameters, the visual field of the progressive lenses of all quality classes is preferably essentially identical to the target visual field. The individual quality classes then differ by the type of optimization of the progressive lenses in the particular quality class as a function of the individual parameters.

Examples of typical average parameters are as follows:

| | |
|---|---|
| Spherical power: | 0.50 dpt |
| Cylindrical effect: | 0.00 dpt |
| Axis direction: | 0 degrees |
| Prism: | 0.00 cm/m |
| Prism base direction: | 0 degrees |
| Interpupillary distance: | 64 mm |
| Corneal vertex distance: | 13 mm |
| Forward inclination: | 7 degrees |
| Horizontal frame inclination: | 5 degrees |
| Optical rotation point distance: | 28.5 mm |

The following quality classes, for example, may be formed as a function of the type of optimization of the progressive lenses in the particular quality class:

Quality Class FL

Quality class FL includes conventional vertex measurement position lenses or conventional surface-optimized progressive lenses. The progressive surface of the progressive lenses in this quality class is optimized only for a specified prescription effect, i.e., for a specified combination of spherical, astigmatic, and prismatic power. Individual parameters such as personal prescription data (spherical, astigmatic, and/or prismatic power) and personal wearer data for the eyeglass wearer (corneal vertex distance, interpupillary distance, etc.) are not taken into account. Furthermore, the progressive surface is optimized taking into account only the surface values (in particular the distribution of the surface refractive value and surface astigmatism) of the progressive surface, and not the characteristics (use value) of the eyeglass lens in the use position (in particular the refractive power and astigmatism of the progressive lens in the use position).

The base curves for the progressive surface are created essentially by overlapping the progressive surface with a spherical surface. The progressive lens is adjusted to the prescription or the prescription data by overlapping with a spherical/toroidal prescription surface. Individual parameters are likewise not taken into account in the calculation of the spherical/toroidal prescription surface.

Examples of commercially available conventional progressive lenses which may be assigned to quality class FL are Progressiv R and S by Rodenstock GmbH, or Essilor Comfort and Essilor Panamic by Essilor.

Quality Class GB

Quality class GB includes conventional progressive lenses optimized for the use position.

The effects of the progressive lenses are divided into intervals or regions. All progressive lenses of an effect interval have (essentially) the same base curve.

The progressive surface of the progressive lenses in this quality class is optimized for multiple combinations of base curve and addition, taking into account the characteristics of the progressive lens in the use position (in particular with regard to the distribution of the use value and the astigmatism in the use position), the optimization being performed for the center of the particular base curve while taking the spherical power into account. However, the personal prescription effect (individual spherical, astigmatic, and/or prismatic power) and personal wearer data for the eyeglass wearer (corneal vertex distance (HSA), interpupillary distance (PD), etc.) are not taken into account in the optimization.

The adjustment to the personal prescription effect or the personal prescription data is performed by overlapping with a spherical/toroidal prescription surface. Individual parameters are likewise not taken into account in the calculation of the spherical/toroidal prescription surface.

Examples of commercially available conventional progressive lenses of this quality class are Progressiv life and Progressiv life XS by Rodenstock GmbH, or Zeiss Gradal HS and Zeiss Gradal RD by Carl Zeiss AG.

Quality Class MG:

Quality class multigressive (MG) includes effect-optimized progressive lenses. The progressive lenses of this quality class are optimized while taking into account the personal prescription data, i.e., the individual spherical, astigmatic, and/or prismatic power of the progressive lens. However, the personal wearer data for the eyeglass wearer (corneal vertex distance (HSA), interpupillary distance (PD), forward inclination, horizontal frame inclination (FSW), etc.) are not taken into account.

Examples of commercially available conventional progressive lenses of quality class MG are Multigressiv ILT, Multigressiv ILT XS, and Multigressiv 2 by Rodenstock GmbH, or Zeiss Gradal TOP OSD by Carl Zeiss AG.

Quality Class ILT

Quality class ILT includes individual progressive lenses. The personal prescription data (spherical, astigmatic, and/or prismatic power) as well as the personal wearer data for the eyeglass wearer (corneal vertex distance (HSA), interpupillary distance (PD), forward inclination, and/or horizontal frame inclination, etc.) are taken into account in the optimization of progressive lenses of this quality class.

Examples of conventional progressive lenses of this quality group are Impression ILT and Impression ILT XS by Rodenstock GmbH, or Zeiss Gradal Individual Short by Carl Zeiss AG.

The following procedure, for example, may be carried out to quantify the monocular visual acuity and/or binocular visual impression:

An initial visual field is defined whose center lies, for example, approximately 8 degrees below the neutral line of sight, and in particular approximately coincides with the prism reference point. This point in particular also approximately coincides with the main line of sight of approximately 5 to 10 degrees below the neutral line of sight. The initial visual field has an essentially elliptical shape, with a vertical extension of approximately 70 degrees and a horizontal extension of approximately 84 degrees. This results in a maximum visual deflection of approximately 27 degrees in the upward direction, approximately 43 degrees in the downward direction, and approximately 42 degrees for nasal and temporal.

The usable initial visual field is also delimited by an eyeglass frame. To this end, for example, a standard ellipse having a vertical height of approximately 40 mm and a horizontal extension of 50 mm may be selected. For a standard corneal vertex distance (HSA), the eyeglass frame thus selected approximately matches the initial visual field.

For large corneal vertex distances the usable initial visual field is delimited by the eyeglass frame, and for small corneal vertex distances, by the maximum possible viewing angle for the initial visual field.

The visual field may preferably be divided into three regions:
a. Far region: the region within the initial visual field delimited by the frame, above a horizontal far-region boundary line $H_F$ having a relative visual acuity reduction $V > V_{limit}$;
b. Near region: the region within the initial visual field delimited by the frame, below a horizontal near-region boundary line $H_N$ having a relative visual acuity reduction $V > V_{limit}$;
c. Intermediate region: the region within the initial visual field delimited by the frame, between the above-referenced horizontal boundary lines, having a relative visual acuity reduction $V > V_{limit}$.

The total viewing region for the visual field is defined as the region within the initial visual field having a relative visual acuity reduction $V > V_{limit}$. The relative visual acuity reduction V is defined as the quotient of the visual acuity when looking through the progressive lens and the initial visual acuity with full correction.

The visual acuity reduction $V_{limit}$ may preferably be assumed in each case to have values between approximately 0.8 and 0.9 for an initial visual acuity of approximately 1.25 to 2.0 in each case. It is particularly preferred for the initial visual acuity to have a value of approximately 2.0, and the visual acuity reduction $V_{limit}$, a value of approximately 0.9.

The boundary line $H_F$ preferably has a height for which the average far-region prescription plus approximately 0.13 dpt is achieved at the main line. The boundary line $H_N$ preferably has a height for which the average far-region prescription plus approximately 0.85*addition is achieved at the main line.

The monocular visual acuity is correlated with (or varied by) the size of the visual field. The size of the visual field may be calculated as the size of the total region. Preferably, however, the visual field size is a function, preferably a weighted sum, of the magnitudes of the individual visual field regions (near region, intermediate region, far region). In this manner it is advantageously possible to effectively prevent an incorrect ratio of the magnitudes of the individual regions (for example, very large far region, but very small or absent near region), which nevertheless results in a relatively large total region.

From the visual field size a relative visual field size may be calculated, which preferably may be expressed as a percentage of the target visual field, all calculations preferably being performed in viewing angles.

The binocular visual impression reflects the overlapping of the visual fields of both eyes, and the spherical and astigmatic imbalances or disequilibria in the corresponding viewing locations. To calculate the binocular visual impression $S_{bin}$, for each line of sight the corresponding viewing point and the spherical and astigmatic deviation occurring at that location are preferably determined or calculated. From this information the monocular visual acuity reduction $V_L$ or $V_R$ of the respective left (L) or right (R) eye and the binocular visual acuity reduction $V_{bin}$ resulting from the spherical and astigmatic imbalances may be calculated or determined. The binocular visual impression $S_{bin}$ results from the product of the worst-case monocular visual acuity reduction $V_R$ or $V_L$ and the binocular visual acuity reduction $V_{bin}$:

$$S_{bin} = V_{bin} * \min(V_R, V_L)$$

The binocular visual impression $S_{bin}$ is good or satisfactory when the visual fields R and L of the right and left eye overlap, and the spherical and astigmatic imbalances are small.

The calculation of the visual field sizes or relative visual field sizes for each quality class is preferably carried out for multiple combinations of the individual parameters.

In a second step S22 the visual field sizes and/or the relative visual field sizes for the progressive lenses for each investigated quality class are calculated for multiple combinations of the individual parameters. The visual field sizes for the individual regions (far, near, and intermediate region) of the visual field are preferably calculated separately.

The individual parameters may preferably be varied approximately as follows:
a. Spherical power of −7.00 to +7.00 dpt in 1.00 dpt increments;
b. Cylinder (magnitude of the cylindrical effect) of 0.50 to 4.00 dpt in 0.50 dpt increments for the 45-degree axis direction, and in 1.00 dpt increments for the 0- and 90-degree axis direction;
c. Prism (magnitude of the prismatic power) of 1.00 to 5.00 cm/m in 1.00 cm/m increments for the prism base directions 45, 0, and 90 degrees;
d. Additions 1.00, 2.00, and 3.00 dpt;
e. Forward inclination of the eyeglass lens for the range 0 to 15 degrees, in 3 degree increments; and/or
f. Horizontal frame inclination for the range of 0 to 25 degrees, in 4 degree increments.

The following individual parameters may also be taken into account:
g. Interpupillary distance for the range 57 to 72 mm, in 3 mm increments;
h. Corneal vertex distance for the range 7 to 18 mm, in 3 mm increments;
i. Axis direction of the cylindrical effect of 0 to 180 degrees in 22.5 degree increments; and/or
j. Prism base direction of the prismatic power of 0 to 360 degrees, in 45 degree increments.

FIGS. 3 through 8 show the relative visual field sizes of the progressive lenses of quality classes ILT, GB, and FL, calculated in this manner, as a function of the particular individual parameters. As shown in FIGS. 3 through 8, the individual visual field regions of the progressive lenses of each quality class (also quality class ILT) change when the individual parameters change (i.e., when the individual parameters deviate from the average parameters), which is reflected in a change in the visual field size or the relative visual field size.

Figure 3:
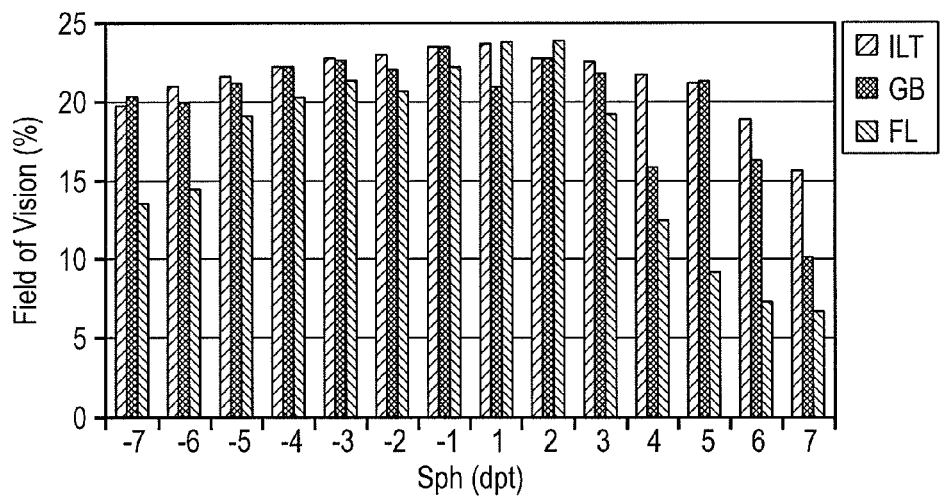
FIG. 3 shows the relative size of the visual field (in percent) as a function of the spherical power.

FIG. 3 is a diagram showing the determined relative visual field size as a function of the spherical power. In FIG. 3 the spherical power is plotted in dpt on the abscissa, and the relative visual field size is plotted in percent on the ordinate. As shown in FIG. 3, for a spherical power of +7.00 dpt the relative visual field size of the progressive lenses of all quality classes (including quality class ILT) is much smaller than at 0 dpt. For progressive lenses of quality classes GB and FL, however, the variation in the relative visual field size as a function of the spherical power is much greater than the variation for progressive lenses of quality class ILT.

It is also apparent from FIG. 3 that the advantages of individual eyeglass lenses (progressive lenses of quality class ILT) are greater for hyperopia than for myopia. As a rule, it may be concluded that progressive lenses having a positive effect react more sensitively to a change in the spherical power than progressive lenses having a negative effect (see FIG. 3).

Furthermore, the advantages of progressive lenses of quality class ILT (individual progressive lenses) for vision in the near region are greater than for vision in the far region.

Figure 4:
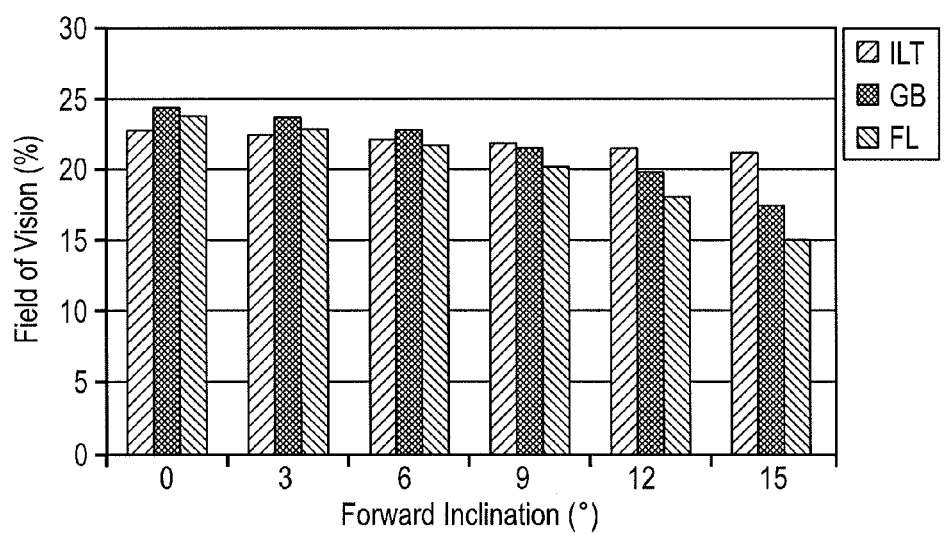
FIG. 4 shows the size of the far region of the visual field of a progressive lens, having a spherical power of −1.0 dpt and an addition of 2.00 dpt, as a function of the forward inclination.

FIG. 4 is a diagram showing the influence of the forward inclination on the size of the far region of the visual field of a progressive lens having a spherical power of −1.0 dpt and an addition of 2.00 dpt. The forward inclination of the progressive lens is plotted in degrees on the abscissa, and the relative size of the far region of the visual field is plotted in percent on the ordinate. The calculation is performed for the monocular case, with an initial visual acuity of approximately 2.0 and a limit value $V_{limit}$ of approximately 0.9.

Figure 5:
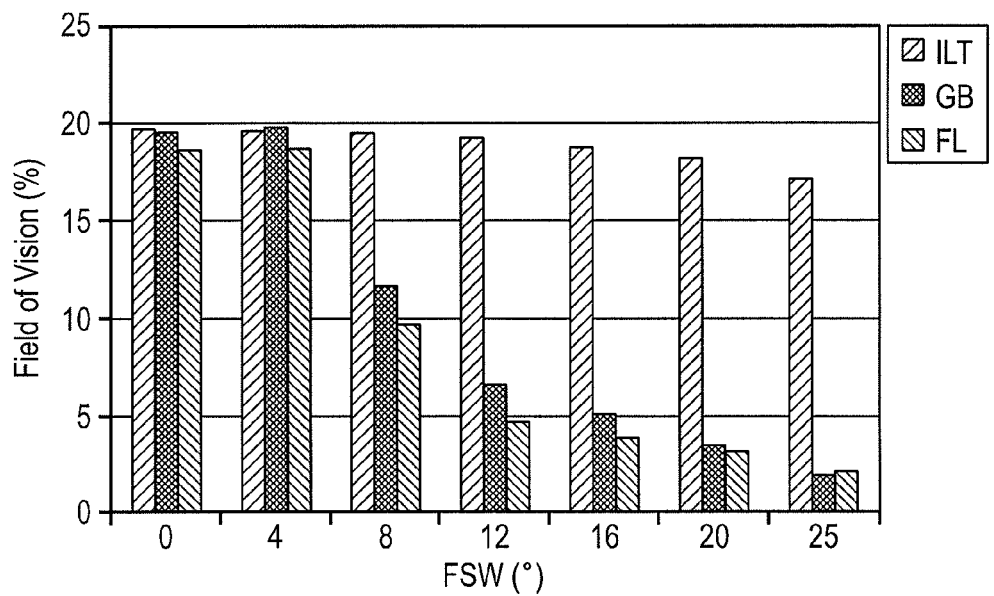
FIG. 5 shows the size of the far region of the visual field of a progressive lens, having a spherical power of −5.0 dpt and an addition of 2.00 dpt, as a function of the horizontal frame inclination.

FIG. 5 is a diagram showing the influence of the horizontal frame inclination on the size of the far region of the visual field of a progressive lens having a spherical power of −5.0 dpt and an addition of 2.00 dpt. The horizontal frame inclination of the progressive lens is plotted in degrees on the abscissa, and the relative size of the far region of the visual field is plotted in percent on the ordinate. The calculation is performed for the monocular case, with an initial visual acuity of approximately 2.0 and a limit value $V_{limit}$ of approximately 0.9.

Figure 6:
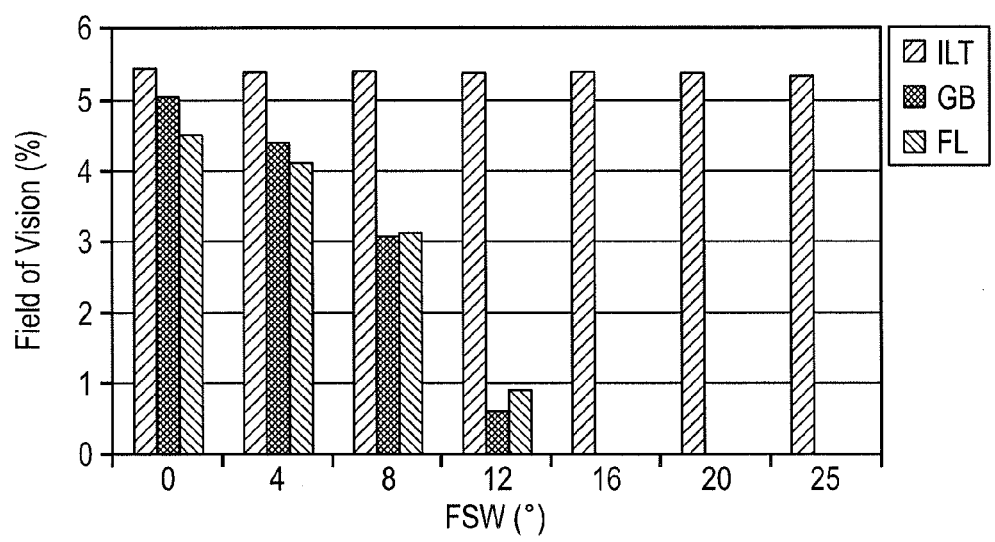
FIG. 6 shows the size of the near region of the visual field of a progressive lens, having a spherical power of −5.0 dpt and an addition of 2.00 dpt, as a function of the horizontal frame inclination.

FIG. 6 is a diagram showing the influence of the horizontal frame inclination on the size of the near region of the visual field of a progressive lens having a spherical power of −5.0 dpt and an addition of 2.00 dpt. The horizontal frame inclination of the progressive lens is plotted in degrees on the abscissa, and the relative size of the near region of the visual field is plotted in percent on the ordinate. The calculation is performed for the monocular case, with an initial visual acuity of approximately 2.0 and a limit value $V_{limit}$ of approximately 0.9.

Figure 7:
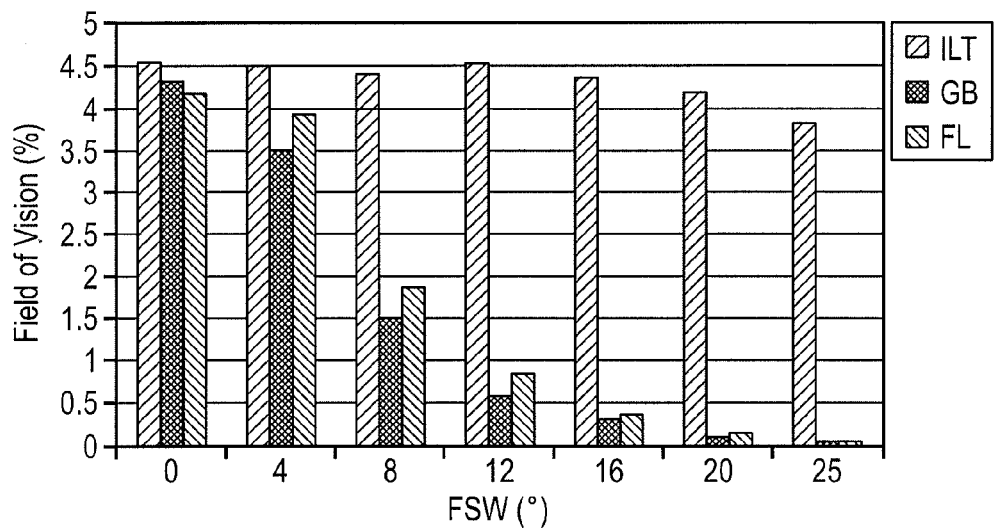
FIG. 7 shows the size of the near region of the visual field of a progressive lens, having a spherical power of −1.0 dpt and an addition of 2.00 dpt, as a function of the horizontal frame inclination.

FIG. 7 is a diagram showing the influence of the horizontal frame inclination on the size of the near region of the visual field of a progressive lens having a spherical power of −1.0 dpt and an addition of 2.00 dpt. The horizontal frame inclination of the progressive lens is plotted in degrees on the abscissa, and the relative size of the near region of the visual field is plotted in percent on the ordinate. The calculation is performed for the binocular case, with an initial visual acuity of approximately 2.0 and a limit value $V_{limit}$ of approximately 0.9.

As shown in FIGS. 4 through 7, progressive lenses of quality classes GB and FL still have a monocular field of view in the far region, up to a horizontal frame inclination of approximately 25 degrees. In contrast, in the near region the progressive lenses of quality classes FL and GB have no field of view at all beginning at approximately 12 degrees.

Figure 8:
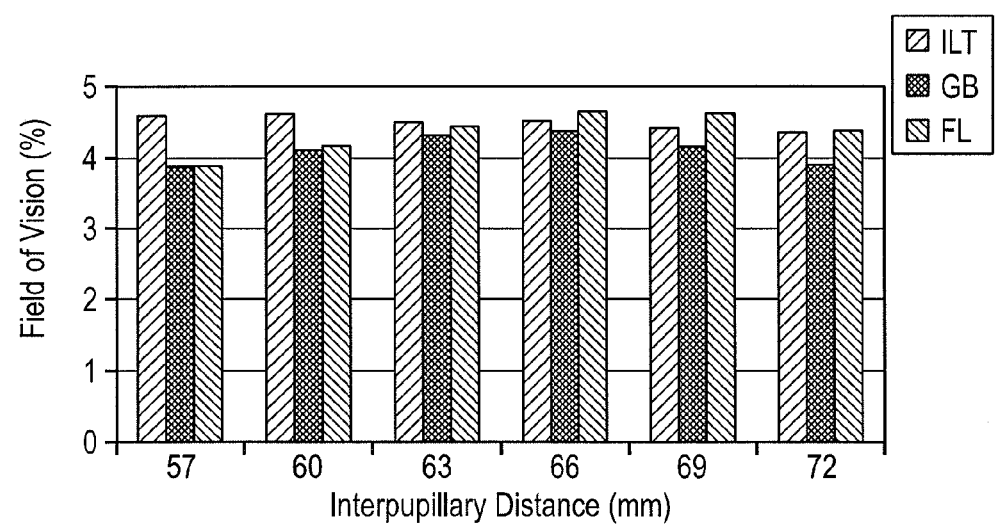
FIG. 8 shows the size of the near region of the visual field of a progressive lens, having a spherical power of −1.0 dpt and an addition of 2.00 dpt, as a function of the interpupillary distance.

FIG. 8 is a diagram showing the influence of the interpupillary distance on the size of the near region of the visual field of a progressive lens having a spherical power of −1.0 dpt and an addition of 2.00 dpt. The interpupillary distance for the progressive lens is plotted in mm on the abscissa, and the relative size of the near region of the visual field is plotted in percent on the ordinate. The calculation is performed for the binocular case, with an initial visual acuity of approximately 2.0 and a limit value $V_{limit}$ of approximately 0.9.

As shown in FIG. 8, the interpupillary distance has a (relatively) small influence on the size of the visual field, i.e., the monocular visual acuity and/or binocular visual impression.

Based on the calculations of the visual field sizes in step S22, a matrix of the visual field sizes of all progressive lenses in the investigated quality classes (in the present case, four quality classes) is obtained or determined as a function of the individual parameters. The relative visual field size of the progressive lenses for the particular quality class for specified individual parameters is then calculated as the relative quotient of the visual field size of the progressive lens using the actual parameters, and the visual field size of the progressive lens is calculated using the standard parameters (i.e., the target visual field size).

In a next step S23, the determined numerical values of the relative visual field sizes are used to fit or approximate functions (performance functions) as a function of the addition, the spherical, astigmatic, or prismatic power, axis direction, prism base direction, corneal vertex distance, interpupillary distance, forward inclination, and/or horizontal frame inclination, etc. These performance functions are preferably N-order polynomials (for example, $$P(X) = \sum_{i=0}^{N} k_i * X^i \Big)$$

preferably of the fifth order, or Euler's equations (for example, $P(X) = k_1 * \sin^2 X + k_2 * \cos^2 X$), where P is the performance function and X is the particular individual parameter.

A first performance function (performance as a function of the spherical power) may preferably be represented as a function of the spherical power Sph by use of a fifth-order polynomial:

$$P_{sph}(Sph) = \sum_{i=0}^{5} a_i * Sph^i$$

A second performance function $P_{Ast}$ (performance as a function of the cylinder, i.e., the magnitude of the astigmatic power) may likewise preferably be represented as a function of the astigmatic power Ast by use of a fifth-order polynomial:

$$P_{Ast}(Ast) = \sum_{i=0}^{5} b_i * Ast^i$$

Coefficients $b_i$ are preferably a function of a fifth-order polynomial of the spherical power.

A third performance function $P_A$ (performance as a function of the axis direction of the astigmatic power) may be represented as a function of the axis direction A, using Euler's transformation: $P_A$ (axis direction)$=A_1*\sin^2 A+A_2*\cos^2 A$. Coefficients $A_{1,2}$ of the direction of the axis are preferably a function of a fifth-order polynomial of the spherical and astigmatic power.

In this manner suitable performance functions may be determined for all parameters (spherical and astigmatic power, axis direction, prismatic power, prism base direction, corneal vertex distance, interpupillary distance, forward inclination, and/or horizontal frame inclination, etc.).

Preferably, however, a dependency up to the third sublevel is sufficient. Thus, for example, the coefficients of the performance function for the prismatic power are a function of the spherical and astigmatic power, but not of the axis direction.

The total performance factor P is then obtained by multiplying together the individual performance functions $P_{Sph}$, $P_{Ast}$, etc.:

$$P=P_{Sph}*P_{Ast}* \ldots$$

A numerical fit is performed for all investigated quality classes (four, for example), resulting in a total performance function P for all quality classes. The calculation of the performance functions, i.e., the total function for each quality class, is preferably carried out in advance. The performance functions may then be stored in a file, database, and/or storage medium.

The method according to the invention allows the performance, i.e., the activity effect or the performance effect, of progressive lenses for a specified combination of individual parameters $\{Sph_a, Ast_a, A_a, \ldots\}$ to be calculated or determined, preferably and specifically without the need to optimize and calculate the progressive lenses themselves.

According to one preferred embodiment, the method for evaluating the performance of progressive lenses also includes inputting the individual parameters. FIG. 9 shows by way of example an input field for inputting personal prescription parameters in a preferred graphical user interface (GUI). FIG. 10 shows by way of example an input field for the personal wearer data for the eyeglass wearer in a preferred graphical user interface.

The method for evaluating or determining the performance of progressive lenses corresponding to the example according to the invention also includes a display of the calculated total performance factors for the particular quality class. The calculated total performance factors are preferably displayed or outputted as bars (see FIG. 11), the lengths of which are correlated with, or dependent on, the calculated total performance factor.

FIG. 11 shows by way of example a display field for the calculated activity effect or performance effect, i.e., total performance factors, of a graphical user interface according to the invention. The magnitude of the calculated total performance factors of the individual quality classes is represented in each case as a number and depicted as a bar, the length of which is correlated with the magnitude of the particular total performance factor. In FIG. 11, reference numeral 2 denotes the total performance factor for quality class ILT; reference numeral 4, the total performance factor for quality class MG (multigressive); reference numeral 6, the total performance factor for quality class GB, and reference numeral 8, the total performance factor for quality class FL. The total performance factors are calculated or determined for the combination of personal prescription data and wearer data for an eyeglass wearer shown in FIGS. 10 and 11.

Figures 12A, 12B, 12C, 12D:
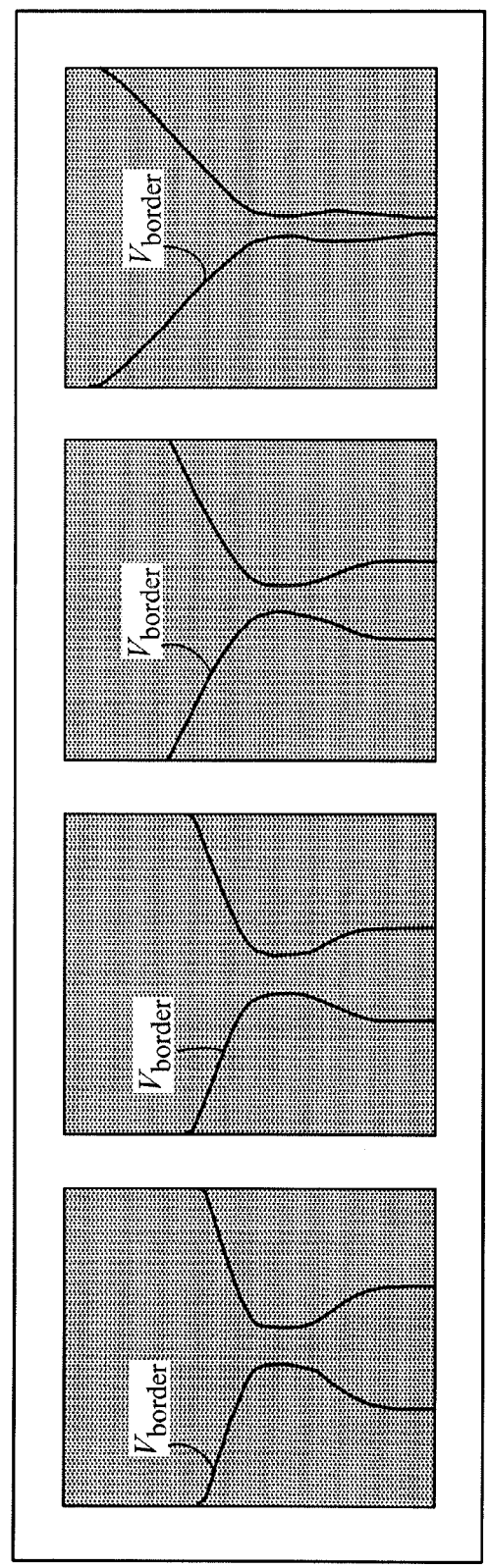
FIG. 12A shows a representation of the visual field of a progressive lens of quality class ILT.
FIG. 12B shows a representation of the visual field of a progressive lens of quality class multigressive.
FIG. 12C shows a representation of the visual field of a progressive lens of quality class GB.
FIG. 12D shows a representation of the visual field of a progressive lens of quality class FL.

The method for evaluating the performance of progressive lenses may also preferably include a display of the individual visual fields or visual field regions for the particular quality class for the specified individual parameters. FIGS. 12A through 12D show the visual fields of a progressive lens of the particular quality class for the specified individual parameters, represented in a preferred graphical user interface. FIG. 12A concerns quality class ILT; FIG. 12B, quality class multigressive; FIG. 12C, quality class GB; and FIG. 12D, quality class FL. Thus, the boundary lines $V_{limit}$ of the visual field are displayed.

Figure 13:
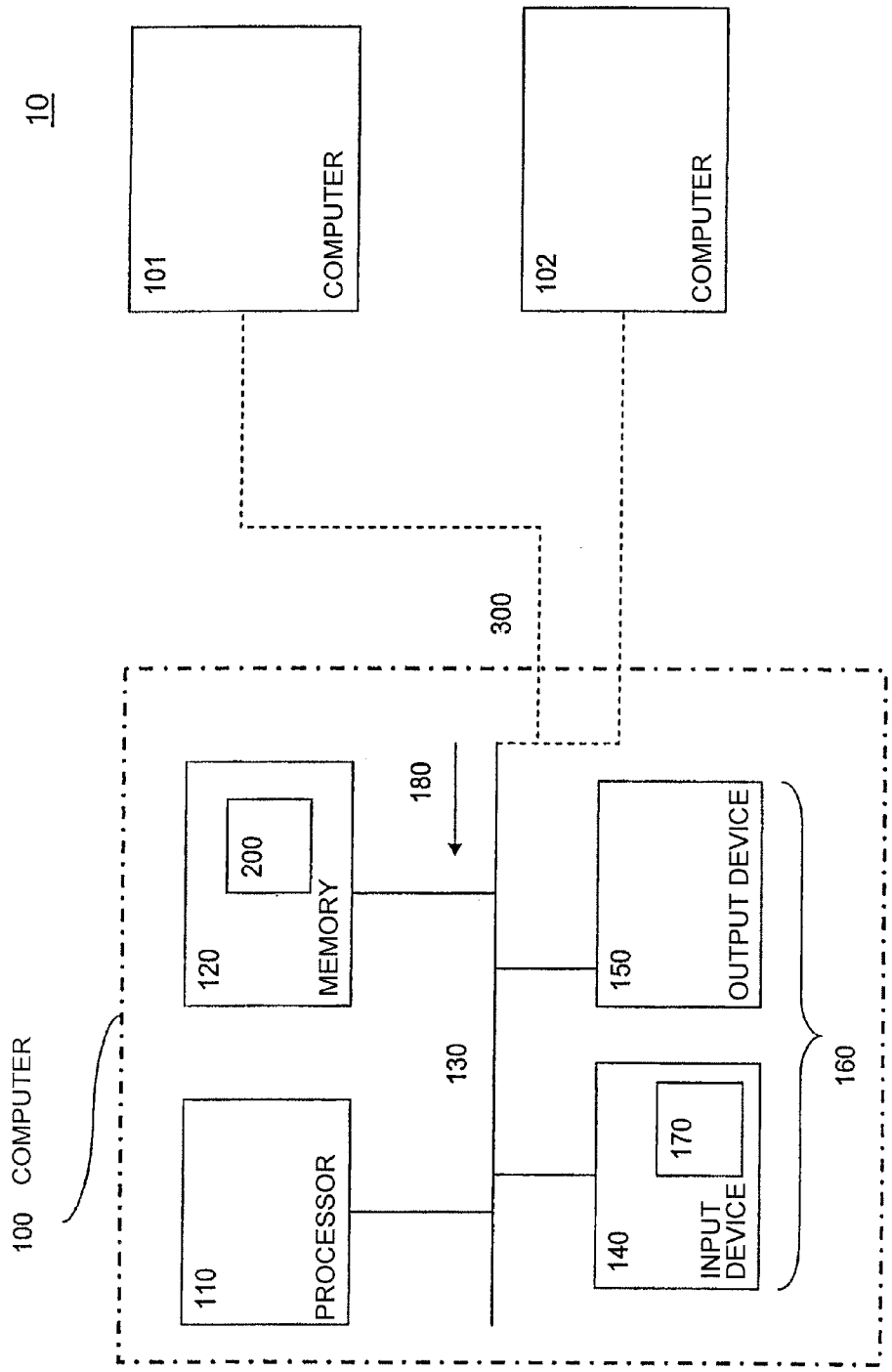
FIG. 13 shows a schematic illustration of one example of a device according to the invention.

FIG. 13 shows a schematic illustration of one example of the preferred device for evaluating the performance of progressive lenses.

The preferred device comprises a computer system 10 having at least one first computer 100. However, the computer system 10 may optionally comprise a plurality of computers $10q$, $q=1, 2, \ldots$, which are connected to one another by a (mono-, bi-, and/or multidirectional network) 300.

The computer 100 has a processor 110, a memory 120, and a bus 130. The computer 100 may also include an input device 140 and/or an output device 150. Elements 110 through 170 of the computer 100 represent in a generalized manner the corresponding elements of computers 101, 102, etc. Computer 100 is, for example, a conventional personal computer (PC), multiprocessor computer, mainframe computer, portable PC (laptop), or stationary PC or the like.

Furthermore, a computer program product 200 is provided which, when loaded and executed on a computer, is designed to carry out a method for evaluating or determining the performance of a progressive lens. The computer program product 200 may be stored on a physical storage medium or program medium 210. The computer program product may also be present in the form of a program signal.

The processor 110 of the computer 100 is, for example, a central processing unit (CPU), microcontroller unit (MCU), or digital signal processor (DSP).

The memory 120 represents elements which store data and commands either temporarily or permanently. Although the memory 120 is shown as part of the computer 100 for clarity, the storage function may be implemented at other locations, for example in the processor itself (cache, register, for example) and/or in the network 300, for example in computers 101/102. The memory 120 may be a read-only memory (ROM), a random-access memory (RAM), a programmable or nonprogrammable PROM, or a memory with other access options. The memory 120 may be physically implemented or stored on a computer-readable program medium, for example on:

(a) a magnetic medium (hard drive, diskette, magnetic band);
(b) an optical medium (CD-ROM, DVD);
(c) a semiconductor medium (DRAM, SRAM, EPROM, EEPROM).

The memory 120 is optionally distributed over various media. Parts of the memory 120 may be permanently or replaceably installed. The computer 100 uses known media such as diskette drives, etc. for reading and writing.

The memory 120 stores supporting components such as, for example, a basic input output system (BIOS), operating system (OS), program library, compiler, interpreter, and/or spreadsheet or word processing program. For clarity these components are not illustrated. Supporting components are commercially available, and may be installed on the computer 100 or implemented therein by specialists.

The processor 110, memory 120, and input and output devices are connected via at least one bus 130 and/or are optionally connected to one another via the (mono-, bi-, or multidirectional) network 300 (the Internet, for example). The bus 130 and the network 300 represent logical and/or physical connections which transmit commands as well as data signals. The signals within the computer 100 are predominantly electrical signals, whereas the signals in the network may be electrical, magnetic, and/or optical signals, or also wireless radio signals.

Network environments (such as the network 300) are typical in offices, company-wide computer networks, Intranets, and on the Internet (i.e., World Wide Web). The physical distance between the computers in the network is irrelevant. The network 300 may be a wireless or wired network. The following are possible examples of implementations of the network 300: a local area network (LAN), wireless local area network (WLAN), wide area network (WAN), ISDN network, infrared connection (IR), a radio connection such as the Universal Mobile Telecommunication System (UMTS), or a satellite connection. Transfer protocols and data formats are known. Examples thereof include Transmission Control Protocol/Internet Protocol (TCP/IP), Hypertext Transfer Protocol (HTTP), Unique Resource Locator (URL), Hypertext Markup Language (HTML), Extensible Markup Language (XML), Wireless Application Markup Language (WML), Wireless Application Protocol (WAP), etc.

The input and output devices may be part of a user interface 160.

The input device 140 stands for a device which provides data and instructions for processing by the computer 100. For example, the input device 140 is a keyboard, display device (mouse, trackball, cursor arrow), microphone, joystick, or scanner. Although all the examples involve devices with human interaction, preferably via a graphical user interface, the device 140 may also function without human interaction, such as a wireless receiver (by means of a satellite antenna or terrestrial antenna, for example), a sensor (a thermometer, for example), or a counter (a workpiece counter in a factory, for example). The input device 140 may be used for reading the storage medium or carrier 170.

The output device 150 refers to a device which displays instructions and data which have already been processed. Examples of such are a monitor or other display (cathode ray tube, flat screen, liquid crystal display, speaker, printer, vibrating alarm). Similarly as for the input device 140, the output device 150 preferably communicates with the user, preferably via a graphical user interface. The output device may likewise communicate with other computers 101, 102, etc.

The input device 140 and the output device 150 may be combined in a single apparatus. Either device 140, 150 may optionally be provided.

The computer program product 200 includes program instructions and optionally data which cause the processor 110 to perform, among other things, the process steps of the method according to the invention or preferred embodiments. In other words, the computer program 200 defines the function of the computer 100 and the interaction thereof with the network system 300. The computer program product 200 may be present, for example, as source code in any given program language, and/or as binary code in compiled form (i.e., machine-readable form). One skilled in the art is able to use the computer program product 200 in conjunction with any of the previously described supporting components (compiler, interpreter, operating system, for example).

Although the computer program product 200 is illustrated as stored in the memory 120, the computer program product 200 may also be stored at any other given location. The computer program product 200 may likewise be stored on the storage medium or program medium 170.

The storage medium 170 is illustrated outside the computer 100 by way of example. The storage medium 170 may be inserted into the input device 140 in order to transfer the computer program product 200 to the computer 100. The storage medium 170 may be implemented as any given computer-readable medium, such as one of the previously described media, for example (see memory 120). The program signal 180, which preferably is transmitted to the computer 100 via the network 300, may likewise contain the computer program product 200 or be a part of same.

Interfaces for coupling the individual components of the computer system 10 are also known. For simplicity the interfaces are not illustrated. An interface may have, for example, a serial interface, parallel interface, game port, universal serial bus (USB), internal or external modem, graphic adapter, and/or sound card.

The invention claimed is:

1. A method for computer-assisted evaluation of performance of progressive lenses carried out on a computer processor and based on individual parameters of a given eyeglass wearer, the individual parameters including at least personal prescription data, the method comprising:

determining the individual parameters;

calculating, using the computer processor, a total performance factor P in each case for at least two quality classes of progressive lenses as a function of the individual parameters, the total performance factor P being correlated with at least one of a quality of monocular visual acuity or binocular visual impression; and outputting the total performance factor P for the at least two quality classes;

wherein the personal prescription data include a spherical power Sph and a magnitude Ast of an astigmatic power;

the total performance factor P is obtained by multiplying a first performance factor $P_1$ (Sph) by a second performance factor $P_2$ (Ast);

the first performance factor $P_1$ is a function $$P_1(Sph) = \sum_{i=0}^{N} a_i * Sph^i$$

of the spherical power Sph;

the second performance factor is a function $$P_2(Ast) \sum_{i=0}^{N} b_i * Ast^i$$

of the magnitude Ast of the astigmatic power; and coefficients $a_i$ are N-order polynomial functions of the magnitude Ast of the astigmatic power, and coefficients $b_i$ are N-order polynomial functions of the spherical power Sph.

2. The method according to claim 1, wherein the personal prescription data include an axis direction A of the astigmatic power; and the total performance factor P is updated by multiplying the total performance factor by a third performance factor $P_3$ (A) = $A_1 * \sin^2 A + A_2 * \cos^2 A$, coefficients $A_1$ and $A_2$ being N-order polynomial functions of the spherical power Sph and the magnitude Ast of the astigmatic power.

3. The method according to claim 2, wherein the personal prescription data include a magnitude Prism of a prismatic power; and the total performance factor is updated by multiplying the total performance factor by a fourth performance factor $$P_4 = \sum_{i=0}^{N} c_i * Prism^i,$$

coefficients $c_i$ being N-order polynomial functions of the magnitude Ast of the astigmatic power and the spherical power Sph.

4. The method according to claim 3, wherein the personal prescription data include a prism base direction B of the prismatic power; and the total performance factor is updated by multiplying the total performance factor by a fifth performance factor $P_5$ (B)=$B_1$ * $\sin^2$ B +$B_2$ * $\cos^2$ B coefficients $B_1$ and $B_2$ being N-order polynomial functions of the spherical power $S_{ph}$ and the magnitude Ast of the astigmatic power.

5. The method according to claim 4, wherein the individual parameters further include personal wearer data;

the personal wearer data include a corneal vertex distance HSA for the eyeglass wearer; and the total performance factor is updated by multiplying the total performance factor by a sixth performance factor $$P_6(HSA) = \sum_{i=0}^{N} d_i * HSA^i.$$

coefficients $d_i$ being N-order polynomial functions of the magnitude Ast of the astigmatic power and the spherical power $S_{ph}$.

6. The method according to claim 5, wherein the personal wearer data include a forward inclination V of the progressive lens provided in a specified eyeglass frame; and the total performance factor is updated by multiplying the total performance factor by a seventh performance factor $$P_7(V) = \sum_{i=0}^{N} e_i * V^i.$$

coefficients $e_i$ being N-order polynomial functions of the magnitude Ast of the astigmatic power and the spherical power $S_{ph}$.

7. The method according to claim 6, wherein the personal wearer data include a horizontal frame inclination FSW of a specified eyeglass frame in which the progressive lens is provided; and the total performance factor is updated by multiplying the total performance factor by an eighth performance factor $$P_8(FSW) = \sum_{i=0}^{N} f_i * FSW^i.$$

coefficients $f_i$ being N-order polynomial functions of the magnitude Ast of the astigmatic power and the spherical power $S_{ph}$.

8. The method according to claim 7, wherein the personal wearer data include an interpupillary distance PD for the eyeglass wearer; and the total performance factor is updated by multiplying the total performance factor by a ninth performance factor $$P_9(PD) = \sum_{i=0}^{N} g_i * PD^i.$$

coefficients $g_i$ being N-order polynomial functions of the magnitude Ast of the astigmatic power and the spherical power $S_{ph}$.

9. The method according to claim 8, wherein the personal prescription data include an addition power ADD of the progressive lens; and the total performance factor is updated by multiplying the total performance factor by a tenth performance factor $$P_{10}(ADD) = \sum_{i=0}^{N} h_i * ADD^i.$$

coefficients $h_i$ being N-order polynomial functions of the magnitude Ast of the astigmatic power and the spherical power $S_{ph}$.

10. The method according to claim 9, wherein N ≦5.

11. The method according to claim 10, wherein the performance factors $P_i = P_i$ (Sph, Ast, A, Prism, B, HSA, V, FSW, PD, ADD), i =1, 2, . . . 10 are calculated in advance for multiple individual parameters for each quality class and stored in a database.

12. The method according to claim 11, wherein the performance factors $P_i = P_i$ (Sph, Ast, A, Prism, B, HSA, V, FSW, PD, ADD), i =1, 2, . . . 10 are determined for multiple combinations of individual parameters by a numerical fitting of data for a relative size of a visual field of the progressive lenses of the particular quality class; and wherein the relative visual field size for a specified combination of individual parameters is defined as a ratio of the size of the visual field of a progressive lens of the particular quality class for a specified combination of individual parameters to a specified target size of the visual field.

13. The method according to claim 12, wherein all progressive lenses of all quality classes have essentially a same basic design, and the quality classes differ with respect to a type of optimization of the progressive lenses in the quality class as a function of the individual parameters.

14. The method according to claim 13, further comprising:

inputting the individual parameters into a graphical user interface; and displaying the total performance factors for the quality classes.

15. The method according to claim 14, wherein the total performance factors are displayed as bars, lengths of which are correlated with the total performance factor.

16. The method according to claim 1, wherein the individual parameters further include personal wearer data;

the personal prescription data include an axis direction A of the astigmatic power, a magnitude Prism of a prismatic power, a prism base direction B of the prismatic power, and an addition power ADD of the progressive lens;

the personal wearer data include a corneal vertex distance HSA for the eyeglass wearer, a forward inclination V of the progressive lens in a specified eyeglass frame, a horizontal frame inclination FSW of a specified eyeglass frame in which the progressive lens is provided, and an interpupillary distance PD for the eyeglass wearer;

the total performance factor is obtained by further multiplying $P_1$ and $P_2$ by a variable X selected from the group consisting of the product of one or more of a third performance factor P3, a fourth performance factor P4, a fifth performance factor P5, a sixth performance factor P6, a seventh performance factor P7, an eighth performance factor P8, a ninth performance factor P9, and a tenth performance factor P10;

wherein $P_3(A) = A_1 * \sin^2 A + A_2 * \cos^2 A$, coefficients $A_1$ and $A_2$ being N-order polynomial functions of the spherical power Sph and the magnitude Ast of the astigmatic power;

$$P_4 = \sum_{i=0}^{N} c_i * Prism^i,$$

coefficients $c_i$ being N-order polynomial functions of the magnitude Ast of the astigmatic power and the spherical power Sph;

$P_5(B) = B_1 * \sin^2 B + B_2 * \cos^2 B$ coefficients $B_1$ and $B_2$ being N-order polynomial functions of the spherical power $S_{ph}$ and the magnitude Ast of the astigmatic power;

$$P_6(HSA) = \sum_{i=0}^{N} d_i * HSA^i;$$

coefficients $d_i$ being N-order polynomial functions of the magnitude Ast of the astigmatic power and the spherical power $S_{ph}$;

$$P_7(V) = \sum_{i=0}^{N} e_i * V^i;$$

coefficients $e_i$ being N-order polynomial functions of the magnitude Ast of the astigmatic power and the spherical power $S_{ph}$;

$$P_8(FSW) = \sum_{i=0}^{N} f_i * FSW^i;$$

coefficients $f_i$ being N-order polynomial functions of the magnitude Ast of the astigmatic power and the spherical power $S_{oh}$;

$$P_9(PD) = \sum_{i=0}^{N} g_i * PD^i;$$

coefficients $g_i$ being N-order polynomial functions of the magnitude Ast of the astigmatic power and the spherical power $S_{ph}$1;

$$P_{10}(ADD) = \sum_{i=0}^{N} h_i * ADD^i.$$

coefficients $h_i$ being N-order polynomial functions of the magnitude Ast of the astigmatic power and the spherical power $S_{ph}$.

17. A non-transitory computer-readable storage medium storing instructions that, when executed by a computer, cause the computer to perform a method of evaluating performance of progressive lenses comprising:

determining individual parameters of a given eyeglass wearer, the individual parameters including at least personal prescription data;

calculating a total performance factor P in each case for at least two quality classes of progressive lenses as a function of the individual parameters, the total performance factor P being correlated with at least one of a quality of monocular visual acuity or binocular visual impression; and outputting the total performance factor P for the at least two quality classes;

wherein the personal prescription data include a spherical power Sph and a magnitude Ast of an astigmatic power;

the total performance factor P is obtained by multiplying a first performance factor $P_1$ by a second performance factor $P_2$;

the first performance factor $P_1$ is a function $$P_1(Sph) = \sum_{i=0}^{N} a_i * Sph^i$$

of the spherical power Sph;

the second performance factor is a function $$P_2(Ast) = \sum_{i=0}^{N} b_i * Ast^i$$

of the magnitude Ast of the astigmatic power; and coefficients $a_i$ are N-order polynomial functions of the magnitude Ast of the astigmatic power, and coefficients $b_i$ are N-order polynomial functions of the spherical power Sph.

18. A device for computer-assisted evaluation of performance of progressive lenses based on individual parameters of a given eyeglass wearer, the individual parameters including at least one of personal prescription data or personal wearer data, comprising:
   determination means for determining the individual parameters;
   calculation means for calculating a total performance factor P in each case for at least two quality classes of progressive lenses as a function of the individual parameters, the total performance factor P being correlated with at least one of a quality of the monocular visual acuity or binocular visual impression; and
   output means for outputting the total performance factor P for the at least two quality classes;
   wherein
   the personal prescription data include a spherical power Sph and a magnitude Ast of an astigmatic power;
   the total performance factor P is obtained by multiplying a first performance factor $P_1$ by a second performance factor $P_2$;
   the first performance factor $P_1$ is a function $$P_1(Sph) = \sum_{i=0}^{N} a_i * Sph^i$$

of the spherical power Sph;
   the second performance factor is a function $$P_2(Ast) = \sum_{i=0}^{N} b_i * Ast^i$$

of the magnitude Ast of the astigmatic power; and
   coefficients $a_i$ are N-order polynomial functions of the magnitude Ast of the astigmatic power, and coefficients $b_i$ are N-order polynomial functions of the spherical power Sph.

19. The device according to claim 18, wherein
   the personal prescription data include an axis direction A of the astigmatic power; and
   the total performance factor P is updated by multiplying the total performance factor by a third performance factor $P_3$ (A) = $A_1$ * $\sin^2 A$ + $A_2$ * $\cos^2 A$, coefficients $A_1$ and $A_2$ being N-order polynomial functions of the spherical power Sph and the magnitude Ast of the astigmatic power.

20. The device according to claim 19, wherein
   the personal prescription data include a magnitude Prism of the prismatic power; and
   the total performance factor is updated by multiplying the total performance factor by a fourth performance factor $$P_4 = \sum_{i=0}^{N} c_i * Prism^i,$$

coefficients $c_i$ being N-order polynomial functions of the magnitude Ast of the astigmatic power and the spherical power Sph.

21. The device according to claim 20, wherein
   the personal prescription data include a prism base direction B of the prismatic power; and
   the total performance factor is updated by multiplying the total performance factor by a fifth performance factor $P_5$ (B) = $B_1$ * $\sin^2 B$ + $B_2$ * $\cos^2 B$ coefficients $B_1$ and $B_2$ being N-order polynomial functions of the spherical power $S_{ph}$ and the magnitude Ast of the astigmatic power.

22. The device according to claim 21, wherein the personal wearer data include a corneal vertex distance for the eyeglass wearer; and
   the total performance factor is updated by multiplying the total performance factor by a sixth performance factor $$P_6(HSA) = \sum_{i=0}^{N} d_i * HSA^i.$$

coefficients $d_i$ being N-order polynomial functions of the magnitude Ast of the astigmatic power and the spherical power $S_{ph}$.

23. The device according to claim 22, wherein
   the personal wearer data include a forward inclination V of the progressive lens provided in a specified eyeglass frame; and
   the total performance factor is updated by multiplying the total performance factor by a seventh performance factor $$P_7(V) = \sum_{i=0}^{N} e_i * V^i.$$

coefficients $e_i$ being N-order polynomial functions of the magnitude Ast of the astigmatic power and the spherical power $S_{ph}$.

24. The device according to claim 23, wherein
   the personal wearer data include a horizontal frame inclination of a specified eyeglass frame in which the progressive lens is provided; and
   the total performance factor is updated by multiplying the total performance factor by an eighth performance factor $$P_8(FSW) = \sum_{i=0}^{N} f_i * FSW^i.$$

coefficients $f_i$ being N-order polynomial functions of the magnitude Ast of the astigmatic power and the spherical power $S_{ph}$.

25. The device according to claim 24, wherein
   the personal wearer data include a interpupillary distance PD for the eyeglass wearer; and
   the total performance factor is updated by multiplying the total performance factor by a ninth performance factor $$P_9(PD) = \sum_{i=0}^{N} g_i * PD^i.$$

coefficients $g_i$ being N-order polynomial functions of the magnitude Ast of the astigmatic power and the spherical power $S_{ph}$.

26. The device according to claim 25, wherein
the personal prescription data include an addition power ADD of the progressive lens; and
the total performance factor is updated by multiplying the total performance factor by a tenth performance factor $$P_{10}(ADD) = \sum_{i=0}^{N} h_i * ADD^i.$$

coefficients $h_i$ being N-order polynomial functions of the magnitude Ast of the astigmatic power and the spherical power $S_{ph}$.

27. The device according to claim 26, further comprising storage means for storing previously calculated performance factors $P_i=P_i$ (Sph, Ast, A, Prism, B, HSA, V, FSW, PD, ADD), i =1, 2, . . . 10 for each quality class for multiple individual parameters.

28. The device according to claim 27, wherein
the performance factors $P_i=P_i$ (Sph, Ast, A, Prism, B, HSA, V, FSW, PD, ADD), i =1, 2, . . . 10 are determined for multiple combinations of individual parameters by a numerical fitting of data for a relative size of a visual field of the progressive lenses of the particular quality class; and wherein
the relative visual field size for a specified combination of individual parameters is defined as a ratio of the size of the visual field of a progressive lens of the particular quality class for a specified combination of individual parameters to a specified target size of the visual field.

29. The device according to claim 28, wherein all progressive lenses of all quality classes have essentially a same basic design, and the quality classes differ with respect to a type of optimization of the progressive lenses in the quality class as a function of the individual parameters.

30. The device according to claim 29, further comprising
input means for inputting the individual parameters into a graphical user interface; and
display means for displaying the total performance factors for the quality classes.

31. The device according to claim 30, wherein the total performance factors are displayed as bars, lengths of which are correlated with the total performance factor.

32. A graphical user interface for representing performance of progressive lenses, while taking into account individual parameters of a given eyeglass wearer, comprising:
at least one performance display section for representing total performance factors P for each quality class of progressive lenses as a function of at least one of personal prescription data or personal wearer data, the total performance factor P being correlated with at least one of a quality of the monocular visual acuity or binocular visual impression; and
at least one prescription data input section for inputting the personal prescription data including at least one of spherical, astigmatic, or prismatic power of the progressive lens;
wherein
the personal prescription data include a spherical power Sph and a magnitude Ast of an astigmatic power;
the total performance factor P is obtained by multiplying a first performance factor $P_1$ by a second performance factor $P_2$;
the first performance factor $P_1$ is a function $$P_1(Sph) = \sum_{i=0}^{N} a_i * Sph^i$$

of the spherical power Sph;
the second performance factor is a function $$P_2(Ast) = \sum_{i=0}^{N} b_i * Ast^i$$

of the magnitude Ast of the astigmatic power; and
coefficients $a_i$ are N-order polynomial functions of the magnitude Ast of the astigmatic power, and coefficients $b_i$ are N-order polynomial functions of the spherical power Sph.

33. The graphical user interface according to claim 32, wherein the performance factors are displayed as bars, lengths of which are correlated with the total performance factor.

34. The graphical user interface according to claim 32, the graphical user interface further comprising:
at least one wearer data input section for inputting personal wearer data for the eyeglass wearer, including at least one of forward inclination, horizontal frame inclination, corneal vertex distance, or interpupillary distance.

35. The graphical user interface according to claim 34, wherein the performance factors are displayed as bars, lengths of which are correlated with the total performance factor P.

* * * * *